(12) United States Patent
Ono

(10) Patent No.: US 9,855,789 B2
(45) Date of Patent: Jan. 2, 2018

(54) THERMOCHROMIC COLOR-MEMORIZING COMPOSITION AND THERMOCHROMIC COLOR-MEMORIZING MICROCAPSULE PIGMENT ENCAPSULATING SAME

(71) Applicant: THE PILOT INK CO., LTD., Aichi-ken (JP)

(72) Inventor: Yoshiaki Ono, Aichi-ken (JP)

(73) Assignee: THE PILOT INK CO., LTD., Aichi-ken (JP)

( * ) Notice: Subject to any disclaimer, the term of this patent is extended or adjusted under 35 U.S.C. 154(b) by 0 days.

(21) Appl. No.: 15/503,777

(22) PCT Filed: Aug. 4, 2015

(86) PCT No.: PCT/JP2015/072143
§ 371 (c)(1),
(2) Date: Feb. 14, 2017

(87) PCT Pub. No.: WO2016/027664
PCT Pub. Date: Feb. 25, 2016

(65) Prior Publication Data
US 2017/0274698 A1 Sep. 28, 2017

(30) Foreign Application Priority Data

Aug. 18, 2014 (JP) ................. 2014-165730
Jun. 24, 2015 (JP) ................. 2015-126119

(51) Int. Cl.
*B41M 5/30* (2006.01)
*C09D 11/17* (2014.01)
(Continued)

(52) U.S. Cl.
CPC ............... *B43K 7/12* (2013.01); *B41M 5/305* (2013.01); *B41M 5/3375* (2013.01); *C09B 11/24* (2013.01);
(Continued)

(58) Field of Classification Search
CPC ........ B41M 5/30; B41M 5/305; B41M 5/337; B41M 5/3375; C09D 11/18; C09D 11/50
(Continued)

(56) References Cited

U.S. PATENT DOCUMENTS
2010/0120614 A1 5/2010 Ono

FOREIGN PATENT DOCUMENTS

| JP | 03-147886 | 6/1991 |
|----|-----------|--------|
| JP | 2004-107367 | 4/2004 |

(Continued)

OTHER PUBLICATIONS

International Search Report (ISR) dated Sep. 8, 2015 in International (PCT) Application No. PCT/JP2015/072143.
(Continued)

*Primary Examiner* — Bruce H Hess
(74) *Attorney, Agent, or Firm* — Wenderoth, Lind & Ponack, L.L.P.

(57) ABSTRACT

Provided are thermochromic color-memorizing composition and thermochromic color-memorizing microcapsule pigment encapsulating the same, the thermochromic color-memorizing composition including: (a) an electron-donating color-developing organic compound; (b) an electron-accepting compound; and (c) an ester compound represented by the following formula (1) as a reaction medium which controls color reaction between the components (a) and (b):

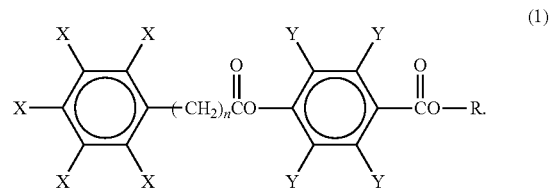

(1)

10 Claims, 1 Drawing Sheet

(51) Int. Cl.
     *C09D 11/18*     (2006.01)
     *C09D 11/50*     (2014.01)
     *B43K 7/12*       (2006.01)
     *C09K 9/02*      (2006.01)
     *C09B 11/24*     (2006.01)
     *B41M 5/337*    (2006.01)

(52) U.S. Cl.
     CPC .............. *C09D 11/17* (2013.01); *C09D 11/50* (2013.01); *C09K 9/02* (2013.01)

(58) Field of Classification Search
     USPC ................................ 503/200–226; 106/31.23
     See application file for complete search history.

(56) References Cited

FOREIGN PATENT DOCUMENTS

| | | |
|---|---|---|
| JP | 2005-1369 | 1/2005 |
| JP | 2006-137886 | 6/2006 |
| JP | 2006-188660 | 7/2006 |
| JP | 2007-118197 | 5/2007 |
| JP | 2008-280523 | 11/2008 |
| WO | 2010/131684 | 11/2010 |
| WO | 2012/046837 | 4/2012 |

OTHER PUBLICATIONS

International Preliminary Report on Patentability dated Feb. 21, 2017 in International Application No. PCT/JP2015/072143.

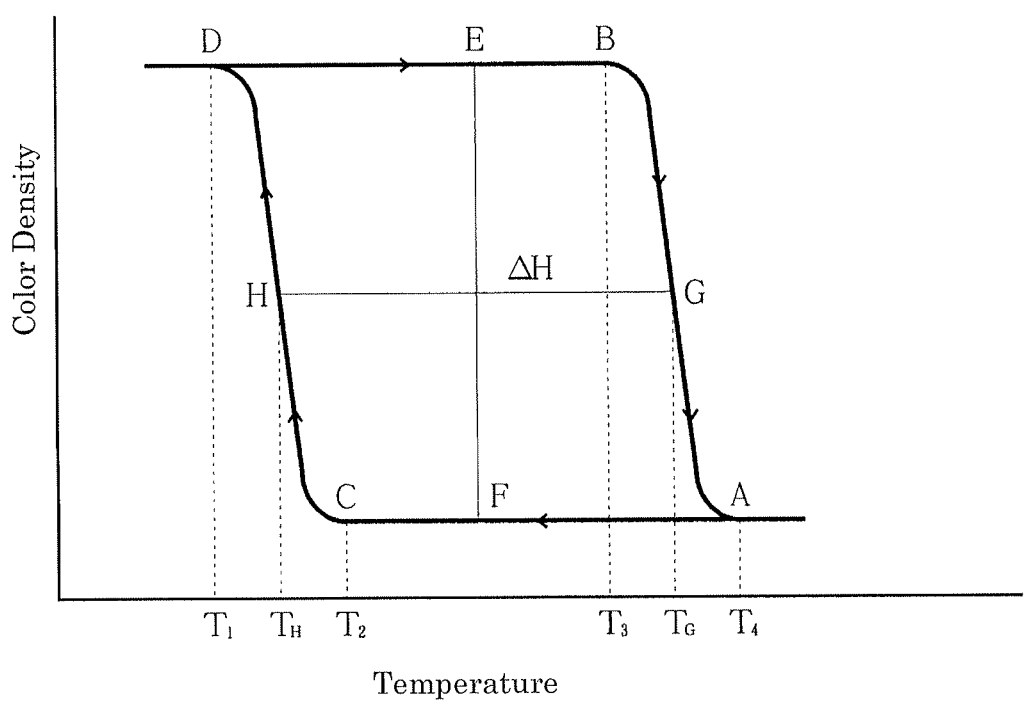

THERMOCHROMIC COLOR-MEMORIZING COMPOSITION AND THERMOCHROMIC COLOR-MEMORIZING MICROCAPSULE PIGMENT ENCAPSULATING SAME

FIELD OF THE INVENTION

The present invention relates to thermochromic color-memorizing composition and thermochromic color-memorizing microcapsule pigment encapsulating the same. More particularly, the present invention relates to: thermochromic color-memorizing composition which displays reversible discoloration between coloration and decoloration showing prominent hysteresis characteristics according to temperature change and retains either a colored state or a decolored state in an interchangeable and reversible manner even after removal of application of heat or cold required for the discoloration; and thermochromic color-memorizing microcapsule pigment encapsulating the composition.

BACKGROUND ART

The present applicant has previously made proposals on thermochromic color-memorizing materials of this kind (see, for example, Patent Documents 1 to 6).

In contrast to reversibly thermochromic materials of a conventional type that change colors across a discoloration temperature, in which only one specific state of those states before and after the discoloration exits in a normal temperature range and the other state is maintained while heat or cold required for the expression of the specific state is being applied but the state in the normal temperature range is restored once the application of heat or cold is terminated, the above-mentioned thermochromic color-memorizing materials not only are capable of selectively maintaining either a color at the lower temperature side than the discoloration temperature or a color at the higher temperature side than the discoloration temperature in a normal temperature range but also can be made to interchangeably maintain these colors by applying thereto heat or cold as required, and such thermochromic color-memorizing materials have thus been applied to a wide variety of fields including the fields of thermochromic recording materials, toys, ornaments and printing.

PRIOR ART DOCUMENTS

Patent Documents

[Patent Document 1] Japanese Patent Laid-open Publication No. 2005-1369
[Patent Document 2] Japanese Patent Laid-open Publication No. 2006-137886
[Patent Document 3] Japanese Patent Laid-open Publication No. 2006-188660
[Patent Document 4] Japanese Patent Laid-open Publication No. 2008-280523
[Patent Document 5] WO 2010/131684
[Patent Document 6] WO 2012/046837

SUMMARY OF THE INVENTION

Problems to be Solved by the Invention

The color-memorizing effect of this kind is expressed only in a system where, among those compounds selected from esters, ketones, ethers and the like that control color reaction, a specific compound is applied as a constituent. The present invention further searches for a compound functioning as a reaction medium which allows the color-memorizing effect to be expressed, and an object of the present invention is to improve the freedom in the selection of a reaction medium and thereby further improve the utilization of such a kind of thermochromic color-memorizing material.

Means for Solving the Problems

The present inventor discovered that a system where a compound having a specific structure is applied as a reaction medium for color reaction allows prominent thermochromic characteristics with a large hysteresis width ($\Delta H$) to be displayed and an effective color-memorizing effect to be thus expressed, thereby completing the present invention.

The present invention relates to thermochromic color-memorizing composition comprising: (a) an electron-donating color-developing organic compound; (b) an electron-accepting compound; and (c) an ester compound represented by the following formula (1) as a reaction medium which controls color reaction between the components (a) and (b):

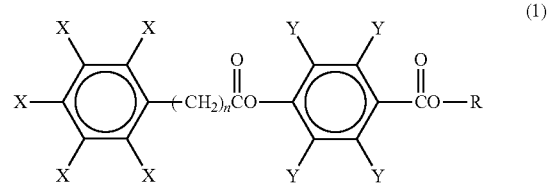

(wherein, R represents an alkyl group having 4 to 22 carbon atoms, an alkenyl group having 4 to 22 carbon atoms, a cycloalkylalkyl group having 6 to 11 carbon atoms or a cycloalkyl group having 5 to 7 carbon atoms; Xs each independently represent a hydrogen atom, an alkyl group, an alkoxy group or a halogen atom; Ys each independently represent a hydrogen atom, an alkyl group, an alkoxy group or a halogen atom; and n represents 0 or 1).

The present invention also relates to thermochromic color-memorizing microcapsule pigment encapsulating the thermochromic color-memorizing composition.

Further, the present invention relates to ink composition comprising the microcapsule pigment and a vehicle.

Effects of the Invention

The thermochromic color-memorizing composition of the present invention induces reversible discoloration between coloration and decoloration and shows a large hysteresis width ($\Delta H$) upon this reversible discoloration in terms of color density-temperature curve. In addition, the thermochromic color-memorizing composition of the present invention is capable of interchangeably memorizing and retaining both colors at the lower temperature side and higher temperature side than the discoloration temperature and is allowed to effectively express a property of reproducing, memorizing and retaining either of these colors in a reversible manner by heating or cooling as required. Therefore, according to the present invention, thermochromic color-memorizing composition applicable to various fields of temperature indication, ornaments, toys, training and learning elements and the like, as well as thermochromic color-memorizing microcapsule pigment encapsulating the composition can be provided.

BRIEF DESCRIPTION OF THE DRAWING

The FIGURE is a graph illustrating the hysteresis characteristics of the thermochromic color-memorizing composition of the present invention in a color density-temperature curve.

MODE FOR CARRYING OUT THE INVENTION

The hysteresis characteristics of the thermochromic color-memorizing composition of the present invention and thermochromic color-memorizing microcapsule pigment comprising the same (a reversibly thermochromic composition having a color-memorizing property and a reversibly thermochromic microcapsule pigment having a color-memorizing property which comprises the same) will now be described based on the graph represented by the color density-temperature curve of The FIGURE.

In FIG. 1, the color density is plotted on the ordinate and the temperature is plotted on the abscissa. A change in the color density due to temperature change occurs along the arrow. Here, "A" is a point which represents the density at a temperature $T_4$ at which a completely decolored state is achieved (hereinafter, referred to as "complete decoloration temperature"); "B" is a point which represents the density at a temperature $T_3$ at which a completely colored state can be maintained (hereinafter, referred to as "decoloration on-set temperature"); "C" is a point which represents the density at a temperature $T_2$ at which a completely decolored state can be maintained (hereinafter, referred to as "coloration on-set temperature"); and "D" is a point which represents the density at a temperature $T_1$ at which a completely colored state is achieved (hereinafter, referred to as "complete coloration temperature").

The discoloration temperature region is a temperature region between $T_1$ and $T_4$, and the temperature region between $T_2$ and $T_3$ is a substantial discoloration temperature region, that is, a temperature region where either a colored state or a decolored state can be maintained.

Specifically, a change of the thermochromic color-memorizing composition from a decolored state to a colored state can be initiated by cooling the thermochromic color-memorizing composition to the coloration on-set temperature ($T_2$) or lower. A completely colored state can be brought about by cooling the thermochromic color-memorizing composition to the complete coloration temperature ($T_1$) or lower, and this state can be maintained unless the temperature of the thermochromic color-memorizing composition is increased to the decoloration on-set temperature ($T_3$).

Further, a change of the thermochromic color-memorizing composition from a colored state to a decolored state can be initiated by heating the thermochromic color-memorizing composition to the decoloration on-set temperature ($T_3$) or higher with application of heat generated by friction or the like. A completely decolored state can be brought about by heating the thermochromic color-memorizing composition to the complete decoloration temperature ($T_4$) or higher, and this state can be maintained unless the temperature of the thermochromic color-memorizing composition is decreased to the coloration on-set temperature ($T_2$).

The length of a line segment EF is a scale representing the contrast of discoloration, and the length of a line segment HG is a temperature width representing the degree of hysteresis (which is hereinafter referred to as "hysteresis width" and denoted as "$\Delta H$"). The greater the $\Delta H$ value, the more easily the respective states before and after discoloration can be maintained. The $\Delta H$ value in which the respective states before and after discoloration can be maintained is 8° C. or greater, specifically in a range of 8° C. to 80° C. Here, $\Delta t$, which is a difference between $T_4$ and $T_3$ or between $T_2$ and $T_1$, is a scale representing the sensitivity of the discoloration, and a practical range thereof is preferably 1° C. to 15° C., more preferably 1° C. to 10° C.

In order to allow only one specific state of those states before and after discoloration to exist in a normal temperature range, the complete decoloration temperature ($T_4$) is preferably 40° C. or higher, more preferably 50° C. or higher, still more preferably 60° C. or higher, and the coloration on-set temperature ($T_2$) is preferably 0° C. or lower, more preferably −5° C. or lower, still more preferably −10° C. or lower.

Specific compounds of the respective components (a), (b) and (c) will be exemplified below.

The component (a) of the present invention, namely an electron-donating color-developing organic compound, is a color-determining component and develops a color and donates an electron(s) to the component (b), which is a color developer.

Examples of the component (a) of the present invention, namely an electron-donating color-developing organic compound, include phthalide compounds, fluoran compounds, styrylquinoline compounds, diazarhodamine lactone compounds, pyridine compounds, quinazoline compounds and bisquinazoline compounds, among which phthalide compounds and fluoran compounds are preferred. Examples of the phthalide compounds include diphenylmethane phthalide compounds, phenylindolyl phthalide compounds, indolyl phthalide compounds, diphenylmethane azaphthalide compounds, phenylindolyl azaphthalide compounds and derivatives of these compounds, among which phenylindolyl azaphthalide compounds and their derivatives are preferred. Examples of the fluoran compounds include aminofluoran compounds, alkoxyfluoran compounds, and derivatives of these compounds.

Examples of an electron-donating color-developing organic compound that can be preferably used in the present invention include the followings:

3,3-bis(p-dimethylaminophenyl)-6-dimethylaminophthalide,
3-(4-diethylaminophenyl)-3-(1-ethyl-2-methylindol-3-yl)phthalide,
3,3-bis(1-n-butyl-2-methylindol-3-yl)phthalide,
3,3-bis(2-ethoxy-4-diethylaminophenyl)-4-azaphthalide,
3-[2-ethoxy-4-(N-ethylanilino)phenyl]-3-(1-ethyl-2-methylindol-3-yl)-4-azaphthalide,
3,6-diphenylaminofluoran,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methoxy-6-diethylaminofluoran,
2-anilino-3-methyl-6-di-n-butylaminofluoran,
2-anilino-3-methoxy-6-di-n-butylaminofluoran, 2-xylidino-3-methyl-6-diethylaminofluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H) isobenzofuran]-3'-one,
2-(diethylamino)-8-(diethylamino)-4-methyl-spiro[5H-(1) benzopyrano(2,3-g)pyrimidine-5,1'(3'H)isobenzofuran]-3-one,
2-(di-n-butylamino)-8-(di-n-butylamino)-4-methyl-spiro [5H-(1)benzopyrano(2,3-g)pyrimidine-5,1'(3'H)isobenzofuran]-3-one,
2-(di-n-butylamino)-8-(diethylamino)-4-methyl-spiro[5H-(1)benzopyrano(2,3-g)pyrimidine-5,1'(3'H)isobenzofuran]-3-one,
2-(di-n-butylamino)-8-(N-ethyl-N-i-amylamino)-4-methyl-spiro[5H-(1)benzopyrano(2,3-g)pyrimidine-5,1'(3'H) isobenzofuran]-3-one,
2-(dibutylamino)-8-(dipentylamino)-4-methyl-spiro[5H-(1) benzopyrano(2,3-g)pyrimidine-5,1'(3'H)-isobenzofuran]-3-one,
3-(2-methoxy-4-dimethylaminophenyl)-3-(1-butyl-2-methylindol-3-yl)-4,5,6,7-tetrachlorophthalide,
3-(2-ethoxy-4-diethylaminophenyl)-3-(1-ethyl-2-methylindol-3-yl)-4,5,6,7-tetrachlorophthalide,
3-(2-ethoxy-4-diethylaminophenyl)-3-(1-pentyl-2-methylindol-3-yl)-4,5,6,7-tetrachlorophthalide,
4,5,6,7-tetrachloro-3-[4-(dimethylamino)-2-methylphenyl]-3-(1-ethyl-2-methyl-1H-indol-3-yl)-1(3H)-isobenzofuranone,
3',6'-bis[phenyl(2-methylphenyl)amino]-spiro[isobenzofuran-1(3H),9'-[9H]xanthen]-3-one,
3',6'-bis[phenyl(3-methylphenyl)amino]-spiro[isobenzofuran-1(3H),9'-[9H]xanthen]-3-one,
3',6'-bis[phenyl(3-ethylphenyl)amino]-spiro[isobenzofuran-1(3H),9'-[9H]xanthen]-3-one,
4-[2,6-bis(2-ethoxyphenyl)-4-pyridinyl]-N,N-dimethylbenzenamine,
2-(4'-dimethylaminophenyl)-4-methoxy-quinazoline, and
4,4'-(ethylenedioxy)-bis[2-(4-diethylaminophenyl)quinazoline].

In addition to those compounds containing a substituent (s) in a xanthene ring-forming phenyl group, the fluoran compounds may also be compounds showing a blue or black color which contain a substituent in a xanthene ring-forming phenyl group as well as a substituent in a lactone ring-forming phenyl group (these substituents may be, for example, an alkyl group such as a methyl group or a halogen atom such as a chloro group).

The component (b) of the present invention, namely an electron-accepting compound, is a compound which receives an electron(s) from the component (a) and functions as a color developer for the component (a).

Examples of the electron-accepting compound include active proton-containing compounds and derivatives thereof; pseudo-acidic compounds (compounds which are not acids but each act as an acid in the composition to cause the component (a) to develop a color); and electron hole-containing compounds. Thereamong, the electron-accepting compound is preferably a compound selected from active proton-containing compounds.

Examples of the active proton-containing compounds and derivatives thereof include phenolic hydroxyl group-containing compounds and metal salts thereof; carboxylic acids and metal salts thereof, preferably aromatic carboxylic acids, aliphatic carboxylic acids having 2 to 5 carbon atoms, and metal salts thereof; acidic phosphoric acid esters and metal salts thereof; azole-based compounds and derivatives thereof; and 1,2,3-triazole and derivatives thereof. Thereamong, phenolic hydroxyl group-containing compounds are preferred since they can allow effective thermal discoloration characteristics to be expressed.

The phenolic hydroxyl group-containing compounds widely include monophenol compounds and polyphenol compounds, and bis-type or tris-type phenols, phenol-aldehyde condensation resins and the like are also included therein. Among the phenolic hydroxyl group-containing compounds, those which contain at least two benzene rings or have a bis-hydroxyphenyl sulfide structure are preferred. Further, these compounds may also have a substituent, examples of which include an alkyl group, an aryl group, an acyl group, an alkoxycarbonyl group, a carboxy group and an ester thereof, as well as an amide group and a halogen group.

When the active proton-containing compounds are metal salts, the metal contained therein is, for example, sodium, potassium, calcium, zinc, zirconium, aluminum, magnesium, nickel, cobalt, tin, copper, iron, vanadium, titanium, lead or molybdenum. Examples of the phenolic hydroxyl group-containing compounds include monophenol compounds and polyphenol compounds, as well as phenolic hydroxyl group-containing compounds having a substituent, such as an alkyl group, an aryl group, an acyl group, an alkoxycarbonyl group, a carboxy group or an ester thereof, an amide group or a halogen group; bis-type and tris-type phenols; and phenol-aldehyde condensation resins. Further, the active proton-containing compounds may also be metal salts of such phenolic hydroxyl group-containing compounds.

Specific examples of the phenolic hydroxyl group-containing compounds include the followings: phenol, o-cresol, tert-butyl catechol, nonylphenol, n-octylphenol, n-dodecylphenol, n-stearylphenol, p-chlorophenol, p-bromophenol, o-phenylphenol, n-butyl-p-hydroxybenzoate, n-octyl-p-hydroxybenzoate, resorcin, dodecyl gallate, 4,4-dihydroxydiphenylsulfone, bis(4-hydroxyphenyl)sulfide,
1,1-bis(4-hydroxyphenyl)ethane,
1,1-bis(4-hydroxyphenyl)propane,
1,1-bis(4-hydroxyphenyl)-n-butane,
1,1-bis(4-hydroxyphenyl)n-pentane,
1,1-bis(4-hydroxyphenyl)-n-hexane,
1,1-bis(4-hydroxyphenyl)-n-heptane,
1,1-bis(4-hydroxyphenyl)-n-octane,
1,1-bis(4-hydroxyphenyl)-n-nonane,
1,1-bis(4-hydroxyphenyl)-n-decane,
1,1-bis(4-hydroxyphenyl)-n-dodecane,
1,1-bis(4-hydroxyphenyl)-2-methylpropane,
1,1-bis(4-hydroxyphenyl)-3-methylbutane,
1,1-bis(4-hydroxyphenyl)-3-methylpentane,
1,1-bis(4-hydroxyphenyl)-2,3-dimethylpentane,
1,1-bis(4-hydroxyphenyl)-2-ethylbutane,
1,1-bis(4-hydroxyphenyl)-2-ethylhexane,
1,1-bis(4-hydroxyphenyl)-3,7-dimethyloctane,
1-phenyl-1,1-bis(4-hydroxyphenyl)ethane,
2,2-bis(4-hydroxyphenyl)propane,
2,2-bis(4-hydroxyphenyl)-n-butane,
2,2-bis(4-hydroxyphenyl)-n-pentane,
2,2-bis(4-hydroxyphenyl)-n-hexane,
2,2-bis(4-hydroxyphenyl)-n-heptane,
2,2-bis(4-hydroxyphenyl)-n-octane,
2,2-bis(4-hydroxyphenyl)-n-nonane,
2,2-bis(4-hydroxyphenyl)-n-decane,
2,2-bis(4-hydroxyphenyl)-n-dodecane, 2,2-bis(4-hydroxyphenyl)ethyl propionate,
2,2-bis(4-hydroxyphenyl)-4-methylpentane,
2,2-bis(4-hydroxyphenyl)-4-methylhexane,
2,2-bis(4-hydroxyphenyl)hexafluoropropane, and
2,2-bis(4-hydroxy-3-methyl phenyl)propane.

By applying a specific ester compound as the component (c) of the present invention, namely a reaction medium which reversibly induces an electron transfer reaction between the components (a) and (b) in a specific temperature range, thermochromic color-memorizing compositions having various discoloration temperatures can be obtained.

The ester compound used in the present invention is a diester compound which is represented by the formula (1) and has two ester bonds —C(=O)—O—:

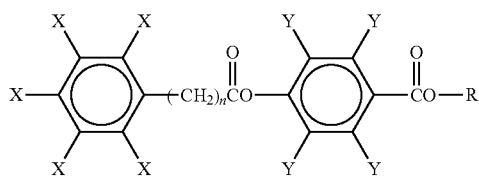

(1)

This diester compound is, however, different from ordinary diester compounds having a symmetrical structure, such as phthalic acid esters, in that the diester compound has an asymmetrical structure about the aromatic ring positioned between the two ester bonds.

In the formula (1), R represents an alkyl group having 4 to 22 carbon atoms, an alkenyl group having 4 to 22 carbon atoms, a cycloalkylalkyl group having 6 to 11 carbon atoms or a cycloalkyl group having 5 to 7 carbon atoms, preferably an alkyl group having 6 to 16 carbon atoms or a cycloalkylalkyl group having 6 to 10 carbon atoms, more preferably an alkyl group having 6 to 14 carbon atoms or a cycloalkylalkyl group having 6 to 8 carbon atoms.

In the formula (1), Xs each represent a hydrogen atom, an alkyl group, an alkoxy group or a halogen atom, preferably a hydrogen atom, an alkyl group having 1 to 8 carbon atoms or an alkoxy group having 1 to 8 carbon atoms, more preferably a hydrogen atom, an alkyl group having 1 to 3 carbon atoms or an alkoxy group having 1 to 3 carbon atoms. The Xs may be the same as or different from each other.

In the formula (1), Ys each represent a hydrogen atom, an alkyl group, an alkoxy group or a halogen atom, preferably a hydrogen atom, an alkyl group having 1 to 8 carbon atoms or an alkoxy group having 1 to 8 carbon atoms, more preferably a hydrogen atom, an alkyl group having 1 to 3 carbon atoms or an alkoxy group having 1 to 3 carbon atoms. The Ys may be the same as or different from each other.

In the formula (1), n represents 0 or 1, preferably 0.

The ester compound represented by the formula (1) can be produced by an arbitrary method, for example, by further esterifying the phenolic hydroxyl group of an ester of a 4-hydroxybenzoic acid derivative (paraben compound) and thereby generating a new ester group.

Among ester compounds represented by the formula (1), specific examples of preferred compounds are shown below.

Compound 1

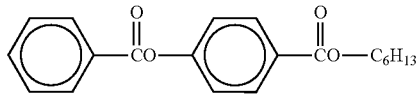

Compound 2

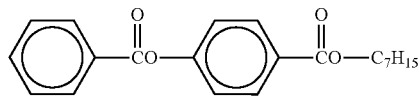

Compound 3

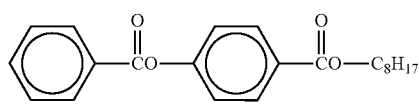

Compound 4

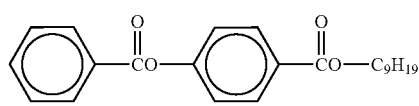

Compound 5

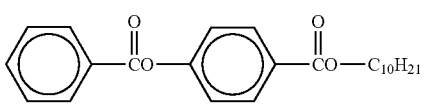

Compound 6

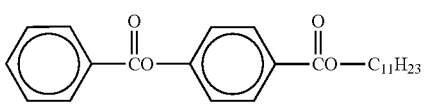

Compound 7

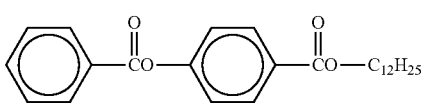

Compound 8

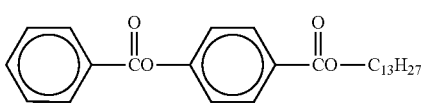

Compound 9

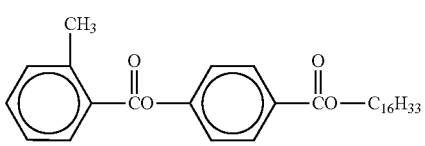

Compound 10

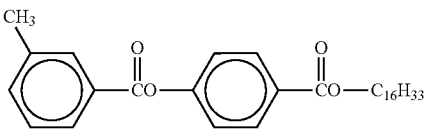

Compound 11

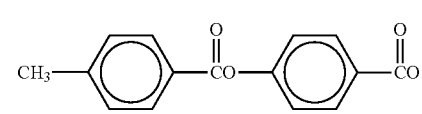

Compound 12

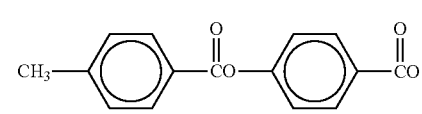

Compound 13

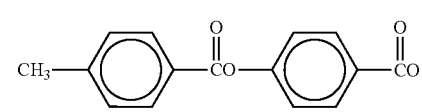

Compound 14
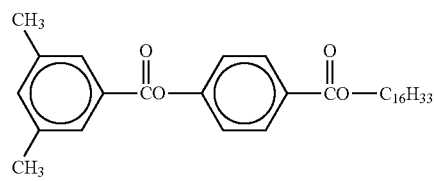
Compound 15
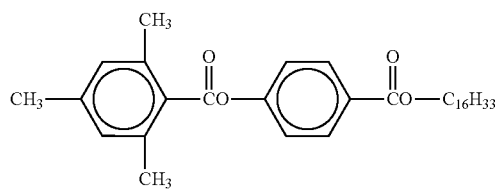
Compound 16
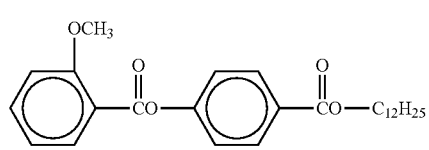
Compound 17
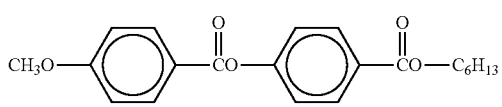
Compound 18
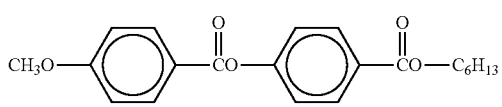
Compound 19
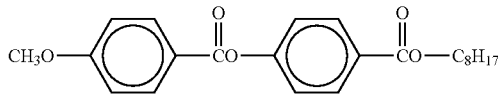
Compound 20
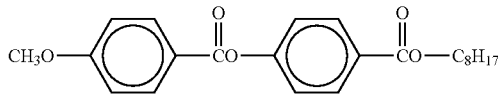
Compound 21
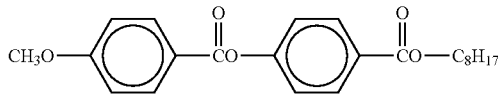
Compound 22
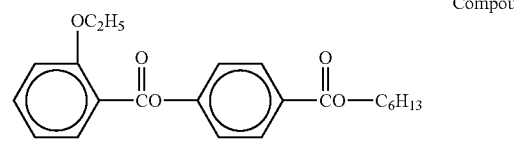
Compound 23
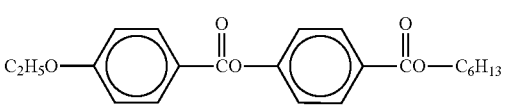
Compound 24
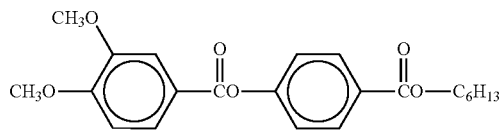
Compound 25
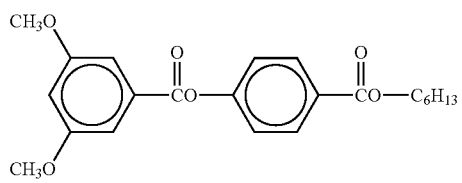
Compound 26
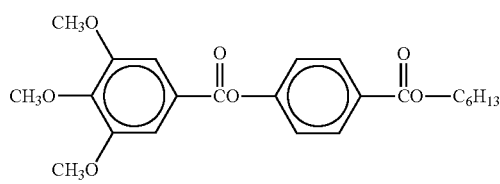
Compound 27
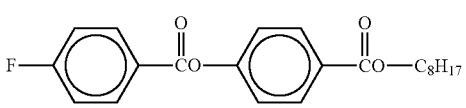
Compound 28
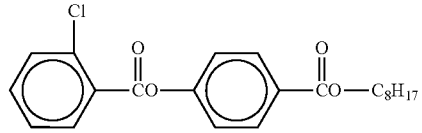
Compound 29
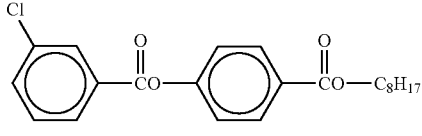
Compound 30
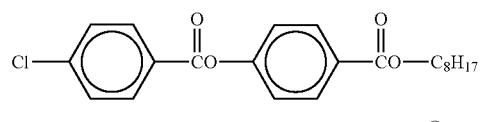
Compound 31
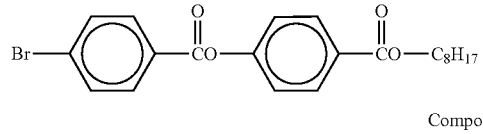
Compound 32
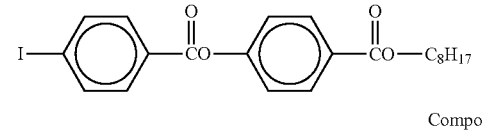
Compound 33
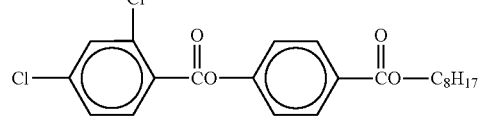

-continued
Compound 34
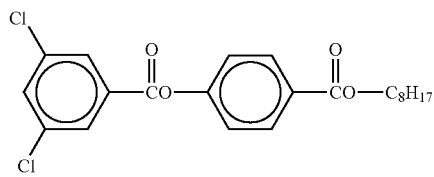
Compound 35
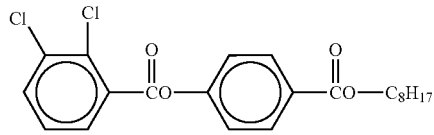
Compound 36
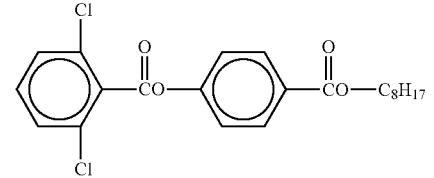
Compound 37
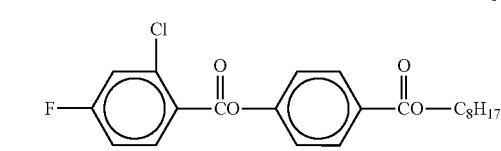
Compound 38
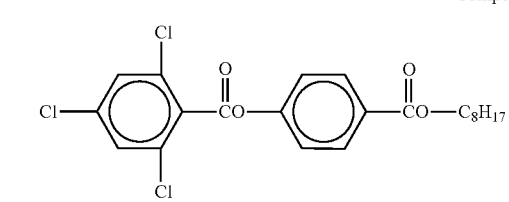
Compound 39
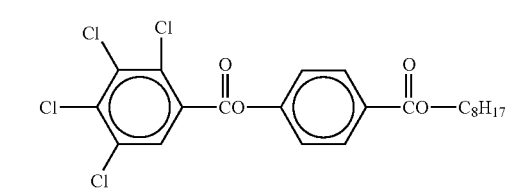
Compound 40
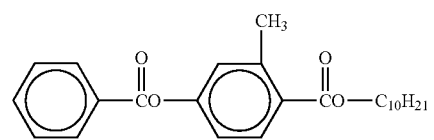
Compound 41
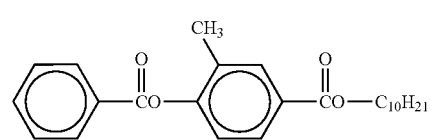
Compound 42
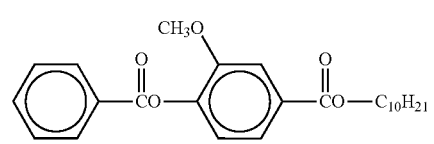
-continued
Compound 43
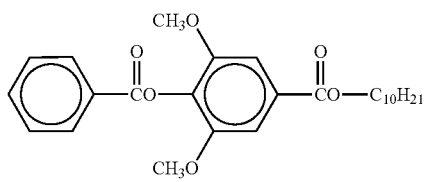
Compound 44
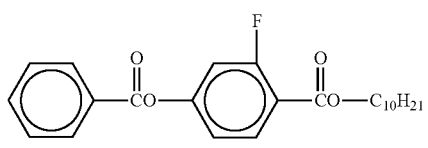
Compound 45
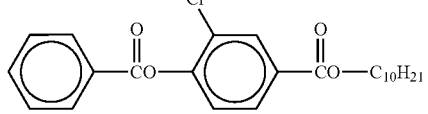
Compound 46
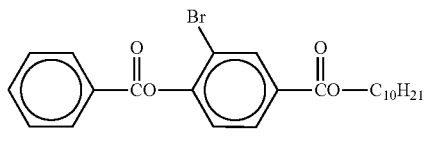
Compound 47
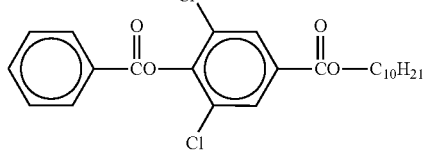
Compound 48
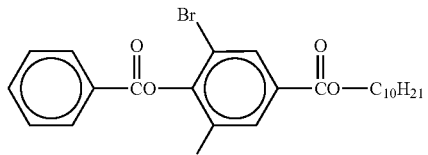
Compound 49
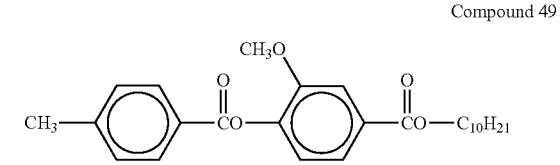
Compound 50
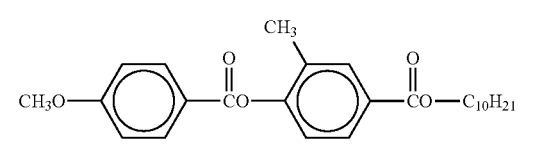
Compound 51
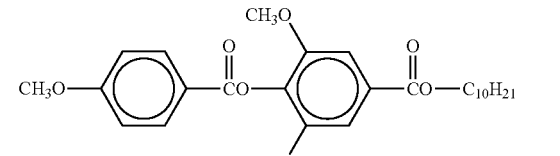

Compound 52
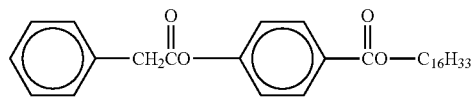

Compound 53
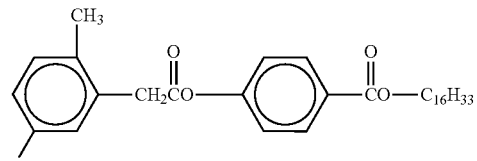

Compound 54
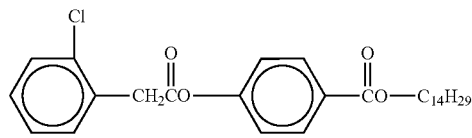

Compound 55
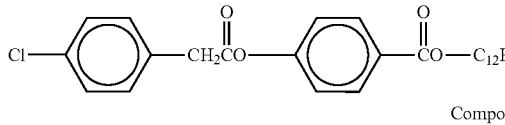

Compound 56
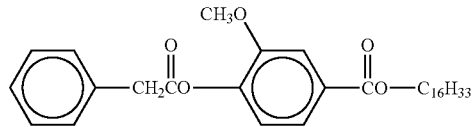

Compound 57
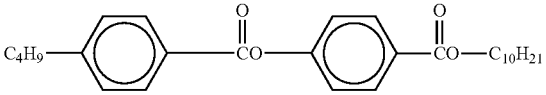

Compound 58
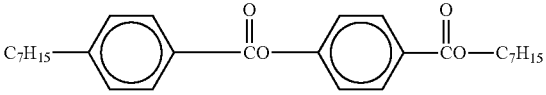

Compound 59
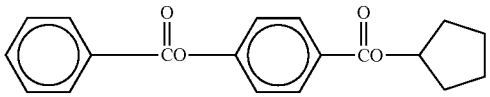

Compound 60
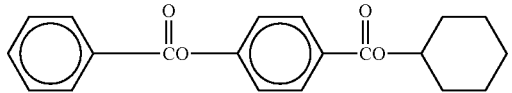

Compound 61
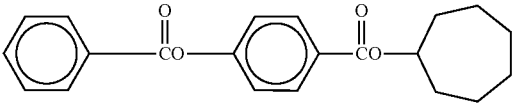

Compound 62
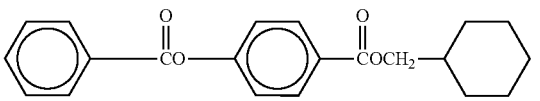

Compound 63
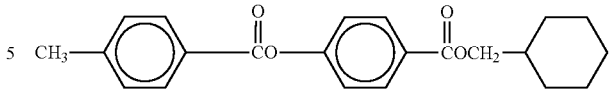

Compound 64
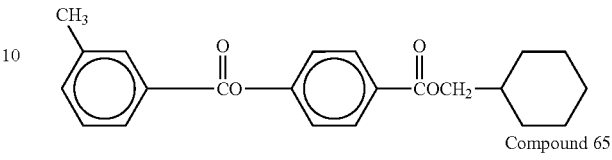

Compound 65
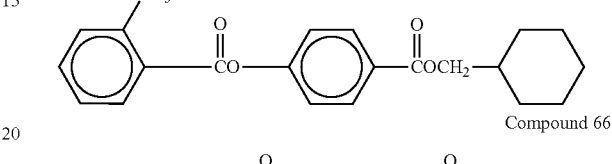

Compound 66
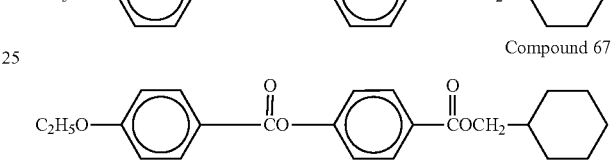

Compound 67
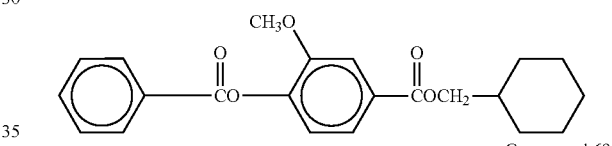

Compound 68
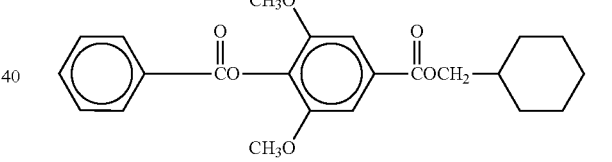

Compound 69
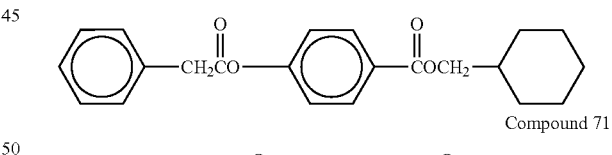

Compound 70
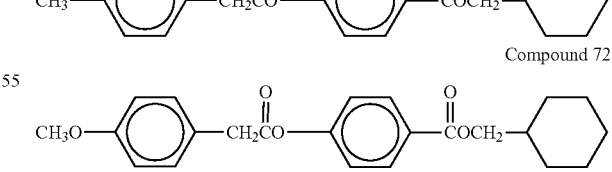

Compound 71
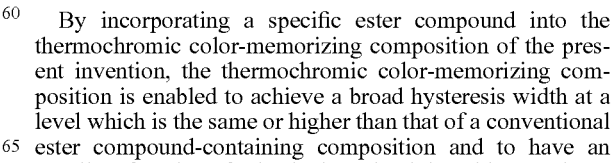

Compound 72

By incorporating a specific ester compound into the thermochromic color-memorizing composition of the present invention, the thermochromic color-memorizing composition is enabled to achieve a broad hysteresis width at a level which is the same or higher than that of a conventional ester compound-containing composition and to have an excellent function of selectively maintaining either a color at the lower temperature side than the discoloration temperature or a color at the higher temperature side than the discoloration temperature; therefore, the thermochromic color-memorizing composition has excellent applicability to various applications.

When the thermochromic color-memorizing composition of the present invention comprises a compound other than the compound represented by the formula (1), the content thereof is preferably 1 to 30 parts by mass, more preferably 2 to 25 parts by mass, still more preferably 3 to 20 parts by mass, with respect to the total mass of the component (c).

In the present invention, the ratio of the components (a), (b) and (c) varies depending on the color density, discoloration temperature, mode of discoloration and the type of each component; however, generally, as a component ratio at which desired properties are obtained, the ratio of the component (b) is in a range of preferably 0.1 to 50 parts, more preferably 0.5 to 20 parts, still more preferably 2 to 20 parts and that of the component (c) is in a range of preferably 1 to 800 parts, more preferably 5 to 200 parts, still more preferably 10 to 200 parts, with respect to 1 part of the component (a) (these ratios are all based on parts by mass).

The components (a), (b) and (c) in the present invention may each be a mixture of two or more compounds. The component (c) in the present invention may also contain two or more compounds satisfying the formula (1). In addition, the component (c) may be used in combination with a conventionally known reaction medium which reversibly induces an electron transfer reaction between the components (a) and (b) in a specific temperature range, such as an ester, alcohol, carboxylic acid, ketone or amide that is not represented by the formula (1).

In the present invention, the three components (a), (b) and (c) can also be encapsulated in a microcapsule to form thermochromic color-memorizing microcapsule pigment. By protecting these components with a capsule membrane wall, it is needless to say that their functions are not deteriorated even if the components are brought into contact with a chemically active substance such as an acidic substance, a basic substance or a peroxide or with other solvent component, and the heat stability can be improved.

Further, the microcapsule pigment can be put into practical use after forming a secondary resin coating film on the surface thereof in accordance with the intended use so as to impart the microcapsule pigment with durability or to modify the surface properties.

If the microcapsule pigment has a small average particle size, its dispersion stability and processing suitability tend to be improved when the microcapsule pigment is blended into an ink composition, a paint or a thermoplastic resin. Further, by making the pigment into fine particles, the ΔH value thereof can be adjusted to be larger than the ΔH value of the composition of the three components. Meanwhile, a large average particle size tends to allow the microcapsule pigment to exhibit high-density color developing properties. Therefore, the average particle size of the microcapsule pigment is preferably 0.1 to 50 μm, more preferably 0.1 to 30 μm, still more preferably 0.5 to 20 μm. By controlling the average particle size of the microcapsule pigment in this range, the practicality of the microcapsule pigment is improved.

The average particle size and the particle size distribution are measured using a laser diffraction/scattering-type particle size distribution analyzer [manufactured by Horiba, Ltd.; LA-300], and the average particle size (median diameter) can be calculated based on volume from the thus measured values.

The ratio between the contents constituting the microcapsule pigment and the membrane wall (contents:membrane wall) is preferably in a range of 7:1 to 1:1 (mass ratio) and, by controlling the ratio in this range, reduction in the color density and clarity during color development can be inhibited. The ratio between the contents and the membrane wall (contents:membrane wall) is more preferably 6:1 to 1:1 (mass ratio).

Examples of a microencapsulation method include conventionally known methods such as interfacial polymerization using an isocyanate system, in situ polymerization using a melamine-formalin system or the like, submerged curing and coating, phase separation from an aqueous solution, phase separation from an organic solvent, melt-dispersion and cooling, gaseous suspension and coating, and spray-drying, and the microencapsulation method is selected as appropriate in accordance with the intended use.

In the microcapsule pigment, a conventional dye or pigment (non-thermochromic one) can also be incorporated so as to allow the microcapsule pigment to exhibit a discoloration behavior from a color (1) to a color (2).

The thermochromic color-memorizing microcapsule pigment can be dispersed in an additive-containing vehicle as required, and the resulting liquid thermochromic color-memorizing composition can be utilized as, for example, (i) a printing ink used in screen printing, offset printing, process printing, gravure printing, coater printing, pad printing or the like; (ii) a paint used in brush coating, spray coating, electrostatic coating, electrodeposition coating, flow coating, roller coating, dip coating or the like; (iii) an ink for writing instruments such as marking pens, ballpoint pens, fountain pens and brush pens; (iv) an ink for coating tools; (v) a painting color; (vi) a cosmetic; or (vii) a coloring liquid for fibers.

Examples of the additive include resins, cross-linking agents, curing agents, desiccants, plasticizers, viscosity-adjusting agents, dispersants, ultraviolet absorbers, infrared absorbers, antioxidants, light stabilizers, dissolution aids, anti-settling agents, lubricants, gelling agents, antifoaming agents, delustering agents, penetrating agents, pH regulators, foaming agents, coupling agents, humectants, antifungal agents, preservatives and anticorrosives.

In cases where the ink composition according to the present invention (hereinafter, may be simply referred to as "ink") is used as an ink composition for writing instrument, examples of the vehicle contained therein include oil-based vehicles containing an organic solvent; and aqueous vehicles containing water and, as required, an organic solvent.

Examples of an organic solvent that can be used in the present invention include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone and N-methyl-2-pyrrolidone.

Examples of the ink include shear-thinning inks containing a shear-thinning agent in a vehicle; and cohesive inks containing an aqueous polymeric coagulant in a vehicle, in which a pigment is suspended in a loosely aggregated state.

By incorporating a shear-thinning agent into the ink, not only aggregation and sedimentation of the pigment but also bleeding of handwriting can be inhibited, so that good handwriting can be made.

Further, in cases where the ink is filled into a ballpoint pen, leakage of the ink from a gap between a ball and a tip can be inhibited when the pen is not in use, and backflow of the ink can be inhibited when the pen is left with the writing end facing upward (in an upright state).

Examples of the shear-thinning agent include xanthan gum; welan gum; succinoglycans (average molecular weight: about 1,000,000 to 8,000,000), which are organic acid-modified hetero-polysaccharides comprising glucose and galactose as constituting monosaccharides; guar gum; locust bean gum and derivatives thereof; hydroxyethyl cellulose; alkyl alginate esters; polymers containing an alkyl ester of methacrylic acid as a main component and having a molecular weight of 100,000 to 150,000; glucomannan; thickening polysaccharides which have a gelation ability and are extracted from seaweeds, such as agar or carrageenin; benzylidene sorbitol, benzylidene xylitol, and derivatives thereof; cross-linkable acrylic acid polymers; inorganic fine particles; nonionic surfactants having an HLB value of 8 to 12, such as polyglycerin fatty acid esters, polyoxyethylene sorbitan fatty acid esters, polyethylene glycol fatty acid esters, polyoxyethylene alkyl ethers, polyoxypropylene alkyl ethers, polyoxyethylene alkylphenyl ethers and fatty acid amides; salts of dialkyl or dialkenyl sulfosuccinic acids; mixtures of N-alkyl-2-pyrrolidone and an anionic surfactant; and mixtures of a polyvinyl alcohol and an acrylic resin.

Examples of an aqueous polymeric coagulant that can be used in the present invention include polyvinylpyrrolidones, polyethylene oxides and aqueous polysaccharides.

Examples of the aqueous polysaccharides include tragacanth gum, guar gum, pullulan, cyclodextrin and aqueous cellulose derivatives, and specific examples of the aqueous cellulose derivatives include methyl cellulose, hydroxyethyl cellulose, hydroxypropyl cellulose, hydroxyethylmethyl cellulose and hydroxypropylmethyl cellulose.

By using such a polymeric coagulant in combination with a comb-type polymeric dispersant containing carboxyl groups in side chains and an organic nitrogen sulfur compound, the dispersibility of loose aggregates of the microcapsule pigment formed by the action of the polymeric coagulant can be improved.

The comb-type polymeric dispersant containing carboxyl groups in side chains is not particularly restricted as long as it is a comb-type polymeric compound having a plurality of carboxyl groups in side chains, and it is preferably an acrylic polymer compound having a plurality of carboxyl groups in side chains, examples of which include SOLSPERSE 43000 (trade name) manufactured by Lubrizol Japan Ltd.

The organic nitrogen sulfur compound further inhibits sedimentation of the microcapsule pigment caused by vibration when the ink is filled in a writing instrument for practical use. This is because the organic nitrogen sulfur compound further improves the dispersibility of the loose aggregates of the microcapsule pigment by the action of the comb-type polymeric dispersant containing carboxyl groups in side chains.

As the organic nitrogen sulfur compound, a compound selected from thiazole-based compounds, isothiazole-based compounds, benzothiazole-based compounds and benzisothiazole-based compounds is used.

As the organic nitrogen sulfur compound, specifically, one or more compounds selected from 2-(4-thiazoyl)-benzimidazole (TBZ), 2-(thiocyanatemethylthio)-1,3-benzothiazol (TCMTB),
2-methyl-4-isothiazolin-3-one and
5-chloro-2-methyl-4-isothiazolin-3-one are used and, preferably, one or more compounds selected from
2-(4-thiazoyl)-benzimidazole (TBZ),
2-methyl-4-isothiazolin-3-one and
5-chloro-2-methyl-4-isothiazolin-3-one are used.

Examples of the organic nitrogen sulfur compound include TOPSIDE 88, TOPSIDE 133, TOPSIDE 170, TOPSIDE 220, TOPSIDE 288, TOPSIDE 300, TOPSIDE 400, TOPSIDE 500, TOPSIDE 600, TOPSIDE 700Z, TOPSIDE 800 and TOPSIDE 950 (trade names), which are manufactured by Permachem Asia Ltd.; and HOKUSTAR HP, HOKUSTAR E50A, HOKUSIDE P200, HOKUSIDE 6500, HOKUSIDE 7400, HOKUSIDE MC, HOKUSIDE 369 and HOKUSIDE R-150 (trade names), which are manufactured by Hokko Sangyo, Co., Ltd.

The mass ratio of the comb-type polymeric dispersant containing carboxyl groups in side chains and the organic nitrogen sulfur compound is preferably 1:1 to 1:10, more preferably 1:1 to 1:5. By satisfying this range, the dispersibility of the loose aggregates of the microcapsule pigment and inhibition of the sedimentation of the microcapsule pigment caused by vibration can be sufficiently exhibited.

Further, by adding an aqueous resin, the resulting ink can be imparted with pigment fixability in handwriting on paper as well as viscosity. This aqueous resin also has a function of further improving the stability of the microcapsule pigment in an ink which contains the comb-type polymeric dispersant having carboxyl groups in side chains and the organic nitrogen sulfur compound.

Examples of the aqueous resin include alkyd resins, acryl resins, styrene-maleic acid copolymers, cellulose derivatives, polyvinylpyrrolidones, polyvinyl alcohols and dextrin, among which a polyvinyl alcohol is preferably used.

Among polyvinyl alcohols, a partially saponified polyvinyl alcohol having a saponification degree of 70 to 89% by mole is more preferably used since it allows the ink to have excellent solubility even in an acidic pH range. As for the amount of the aqueous resin to be added, it is added to the ink in a range of preferably 0.3 to 3.0% by mass, more preferably 0.5 to 1.5% by mass.

In cases where the ink is filled into a ballpoint pen, it is preferred to prevent abrasion of the ball-receiving base by adding a lubricant, examples of which include higher fatty acids such as oleic acid; nonionic surfactants having a long-chain alkyl group; polyether-modified silicone oils; thiophosphorous acid triesters such as tri(alkoxycarbonylmethylester) thiophosphite and tri(alkoxycarbonylethylester) thiophosphite; phosphomonoesters of polyoxyethylene alkyl ether or polyoxyethylene alkylaryl ether; phosphodiesters of polyoxyethylene alkyl ether or polyoxyethylene alkylaryl ether; and metal salts, ammonium salts, amine salts and alkanolamine salts thereof.

Further, by incorporating 2,5-dimercapto-1,3,4-thiadiazole and/or a salt thereof, even when the pH of the ink is in an acidic or alkaline range, not only defective dispersion and aggregation of the microcapsule pigment which occur after the once-frozen ink is thawed again can be suppressed and an increase in the viscosity of the ink and its accompanying blurring and color-fading of handwriting can be inhibited, but also, when the ink is used in a ballpoint pen, corrosion of the ball can be inhibited.

In addition, if necessary, (i) a resin for imparting the ink with fixability to paper surface and viscosity, such as an acryl resin, a styrene-maleic acid copolymer, a cellulose derivative, polyvinylpyrrolidone, polyvinyl alcohol or dextrin; (ii) a pH regulator, for example, an inorganic salt such as sodium carbonate, sodium phosphate or sodium acetate, or an organic basic compound such as an aqueous amine compound; (iii) an anticorrosive such as benzotriazole, tolyltriazole, dicyclohexylammonium nitrite, diisopropylammonium nitrite or saponin; (iv) a preservative or an antifungal agent, such as phenol, sodium salt of 1,2-benzthiazolin-3-one, sodium benzoate, sodium dehydroacetate, potassium sorbate, paraoxypropylbenzoate or 2,3,5,6-tetrachloro-4-(methylsulfonyl)pyridine; (v) a wetting agent such as urea, a non-ionic surfactant, a reduced or non-reduced starch hydrolysate, an oligosaccharide (e.g. trehalose), sucrose, cyclodextrin, glucose, dextrin, sorbitol, mannitol or sodium pyrophosphate; (vi) an antifoaming agent; (vii) a dispersant; and/or (viii) a fluorine-containing or non-ionic surfactant for improving the permeability of the ink may also be added.

The ink can contain the thermochromic color-memorizing microcapsule pigment in an amount of preferably 5 to 40% by mass, more preferably 10 to 40% by mass, still more preferably 10 to 30% by mass, with respect to the total mass of the ink. By controlling the amount of the microcapsule pigment in this range, a desirable color development density can be achieved and deterioration of the ink outflow properties can be inhibited.

A writing instrument in which the ink composition of the present invention can be stored will now be described. In one embodiment, the writing instrument comprises: an axial barrel which stores the ink; and a pen body which delivers the ink from the axial barrel. Examples of the pen body include a marking pen body, a ballpoint pen body and a brush pen body. Examples of the marking pen body include marking tips such as fiber tips, felt tips and plastic tips. Examples of the ballpoint pen body include ballpoint pen tips. Examples of the brush pen body include fiber bundles in which fibers are tightly bundled with each other along the longitudinal direction; plastic porous articles having continuous pores; heat-fused or resin-processed articles of synthetic resin fibers; and extrusion-molded articles of a soft resin or an elastomer.

The use of the ink composition of the present invention in a ballpoint pen or a marking pen will now be described in more detail.

In cases where the ink composition of the present invention is filled into a ballpoint pen, the structure and shape of the ballpoint pen itself are not particularly restricted, and examples thereof include a ballpoint pen which comprises an ink-storing tube filled with a shear-thinning ink in an axial barrel, the ink-storing tube being connected to a ballpoint pen tip fitted with a ball at one end and having a liquid plug for prevention of backflow which is provided in close contact with the end surface of the ink in the ink-storing tube.

Explaining the ballpoint pen tip in more detail, for example, a tip holding a ball in a ball-holding section formed by press-deforming the vicinity of one end of a metal pipe inwardly from outside; a tip holing a ball in a ball-holding section formed by cutting a metal material using a drill or the like; a tip made of a metal or plastic, in which a ball-receiving base made of a resin is arranged; or a tip in which a ball held therein is pressed forward by a spring can be suitably used.

As the ball, one which is made of cemented carbide, stainless steel, ruby, ceramic, resin, rubber or the like can be used. The ball has a diameter of preferably 0.3 to 2.0 mm, more preferably 0.3 to 1.5 mm, still more preferably 0.3 to 1.0 mm.

As the ink-storing tube which stores the ink, for example, a molded article made of a thermoplastic resin such as polyethylene, polypropylene, polyethylene terephthalate or nylon, or a metal tube can be used.

The ink-storing tube may be directly connected with the tip, or the ink-storing tube may be connected with the tip via a connection member.

The ink-storing tube may be in the form of a refill arranged in an axial barrel made of a resin or metal, or an axial barrel fitted with a tip on one end may itself be used as an ink-storing body and the ink may be directly filled into this axial barrel.

The ballpoint pen may be one which is equipped with a cap covering the ballpoint pen tip, or a retractable ballpoint pen with no cap.

In cases where the ink is stored in a retractable ballpoint pen, the structure and shape of the retractable ballpoint pen are not particularly restricted, and any retractable ballpoint pen can be used as long as it has a structure in which the ballpoint pen refill is housed inside an axial barrel with the writing end provided on the ballpoint pen refill being exposed to the outside air and the writing end is projected from the opening of the axial barrel by the action of a projection-retraction mechanism.

Retractable ball point pens can be classified into, for example, knock-type ballpoint pens, rotation-type ballpoint pens and slide-type ballpoint pens.

The knock-type ballpoint pens can take, for example, a configuration in which a knocking part is arranged on the rear end or side of the axial barrel and the ballpoint pen tip is projected from the front-end opening of the axial barrel by pushing the knocking part, or a configuration in which the ballpoint pen tip is projected from the front-end opening of the axial barrel by pushing a clip arranged on the axial barrel.

The rotation-type ballpoint pens can take, for example, a configuration in which a rotary part is arranged on a rear part of the axial barrel and the ballpoint pen tip is projected and retracted through the front-end opening of the axial barrel by rotating the rotary part.

The slide-type ballpoint pens can take, for example, a configuration in which a slide is arranged on the side of the axial barrel and the ballpoint pen tip is projected and retracted through the front-end opening of the axial barrel by operating the slide, or a configuration in which the ballpoint pen tip is projected and retracted through the front-end opening of the axial barrel by sliding a clip arranged on the axial barrel.

The retractable ballpoint pens may be of a complex type in which a plurality of ballpoint pen refills are stored in the axial barrel and the writing end of any one of the ballpoint pen refills is projected and retracted through the front-end opening of the axial barrel by the action of a projection-retraction mechanism.

Generally, an ink follower is added to the rear end of the ink stored in the ink-storing tube.

The ink follower composition generally comprises a non-volatile liquid or a hardly volatile liquid. Specific examples thereof include vaseline, spindle oil, castor oil, olive oil, refined mineral oil, liquid paraffin, polybutene, α-olefins, oligomers and co-oligomers of α-olefins, dimethyl silicone oil, methylphenyl silicone oil, amino-modified silicone oil, polyether-modified silicone oil, and fatty acid-modified silicone oil. These may be used individually, or two or more thereof may be used in combination.

It is preferred that the viscosity of the non-volatile liquid and/or hardly volatile liquid be increased to an appropriate level by adding thereto a thickening agent. Examples of the thickening agent include silica having a hydrophobized surface; particulate silica having a methylated surface; aluminum silicate; swellable mica; clay-based thickening agents such as hydrophobized bentonite and montmorillonite; fatty acid metal soaps such as magnesium stearate, calcium stearate, aluminum stearate and zinc stearate; tribenzylidene sorbitol; fatty acid amides; amide-modified polyethylene wax; hydrogenated castor oil; dextrin-based compounds such as fatty acid dextrin; and cellulose-based compounds.

Further, the liquid ink follower may also be used in combination with a solid ink follower.

In cases where the ink composition of the present invention is filled into a marking pen, the structure and shape of the marking pen itself are not particularly restricted, and examples thereof include a marking pen in which an ink absorbent composed of a fiber bundle is installed in an axial barrel, a marking pen tip composed of a fiber processed body having capillary gaps formed therein is fitted on the axial barrel directly or via a connection member, and a cohesive ink is impregnated into the ink absorbent of the marking pen formed by connecting the ink absorbent and the tip; and a marking pen in which a tip and an ink-storing tube are arranged via a valve which is opened by pushing the tip and an ink is directly stored in the ink-storing tube.

The tip is a conventionally and widely used porous member having communicating pores whose porosity is selected to be in a range of about 30 to 70% and which is made of resin-processed fibers, a fused material of heat-melting fibers, a felt or the like, and one end of the tip is processed into a shape conforming to the intended purpose, such as a cannonball shape, a rectangular shape or a chisel shape, before being put into practical use.

The ink absorbent is obtained by bundling crimped fibers in the longitudinal direction and configured such that it is provided in a covering material such as a plastic cylinder or a film and the porosity is adjusted to be in a range of about 40 to 90%.

As the valve, a conventionally and widely used pump-type valve can be used; however, a valve whose spring pressure is set such that the valve can be push-opened by writing pressure is preferred.

Further, the form of the ballpoint pen and that of the marking pen are not restricted to the above-described ones, and the writing instrument may be of a double-headed type which is fitted with tips of different forms or with pen tips delivering inks of different colors.

A handwriting produced by writing on a writing surface using a writing instrument containing the ink of the present invention is allowed to change its color by the work of a heating tool or cooling tool.

As the heating tool, for example, an electro-heating discoloration device equipped with a resistance heating element, a heating discoloration device loaded with hot water or the like, or a hair dryer can be suitably used; however, a friction member is preferably used as a means which enables discoloration by a simple method. Particularly, an elastic material that is not substantially abraded by rubbing is preferred.

The friction member is preferably an elastic material such as an elastomer or foamed plastic, which has excellent elasticity and is capable of generating appropriate friction when rubbed and frictional heat is thereby produced.

A handwriting can also be rubbed with an ordinary rubber eraser used for erasing handwriting with a pencil; however, since eraser crumbs are generated by the rubbing, the above-described friction member which hardly generates such crumbs is preferably used.

As the material of the friction member, for example, a silicone resin, an SEBS resin (styrene-ethylene-butadiene-styrene block copolymer) or a polyester resin is used.

The friction member can be combined with a writing instrument and other member having an arbitrary shape (friction body) to obtain a writing instrument set, and excellent portability is attained by arranging the friction member on the writing instrument.

In the case of a writing instrument equipped with a cap, the position at which the friction member is arranged is not particularly restricted. For example, the cap itself can be formed by the friction member; the axial barrel itself can be formed by the friction member; when a clip is arranged, the clip itself can be formed by the friction member; or the friction member can be arranged on the front end (crown) of the cap or the rear end of the axial barrel (the part where a writing end is not arranged).

In the case of a retractable writing instrument as well, the position at which the friction member is arranged is not particularly restricted. For example, the axial barrel itself can be formed by the friction member; when a clip is arranged, the clip itself can be formed by the friction member; or the friction member can be arranged in the vicinity of an opening of the axial barrel, on the rear end of the axial barrel (the part where a writing end is not arranged), or on the knocking part.

As the cooling tool, for example, a cryogenic discoloration device utilizing a Peltier element, a cryogenic discoloration device loaded with a refrigerant such as cold water or crushed ice, a refrigerator or a freezer can be suitably used.

In cases where the liquid thermochromic color-memorizing composition is coated or printed, the material of a support therefor is not restricted and any material is effective. Examples thereof include paper, synthetic papers, fibers, fabrics, synthetic leathers, leathers, plastics, glass, ceramics, metals, wood and stone. The shape of the support is not restricted to a planar shape, and the support may have an irregular shape.

By arranging a reversibly thermochromic layer containing the thermochromic color-memorizing composition on the support, a laminate (printed article) can be obtained.

In cases where a non-thermochromic colored layer (including an image) has been formed on the support in advance, the colored layer can be made visible or invisible depending on temperature change by applying thereto a reversibly thermochromic layer, and this enables to further diversify the mode of change.

Further, the thermochromic color-memorizing microcapsule pigment can also be melt-blended with a thermoplastic resin, thermosetting resin, wax or the like into the form of a pellet, powder or paste and utilized as a resin composition for thermochromic color-memorizing molded article. By a widely used means such as injection molding, extrusion molding, blow molding or cast molding, a molded article in the form of a three-dimensional article of an arbitrary shape, film, sheet, plate, filament, rod, pipe or the like can be obtained.

Moreover, a crayon can also be obtained by melt-blending the thermochromic color-memorizing microcapsule pigment into a thermoplastic resin or wax.

In the liquid composition and resin composition, a conventional dye or pigment (non-thermochromic one) can also be incorporated so as to allow the liquid composition and resin composition to exhibit a discoloration behavior from a color (1) to a color (2).

By laminating a layer containing a light stabilizer and/or a transparent metallic luster pigment on a molded article obtained by molding the laminate or resin composition, the light resistance of the molded article can be improved, or the durability can be improved by arranging a topcoat layer thereon.

Examples of the light stabilizer include ultraviolet absorbers, antioxidants, singlet oxygen quenchers, superoxide anion quenchers and ozone quenchers.

Examples of the transparent metallic luster pigment include pigments prepared by coating the surface of a core substance, such as natural mica, synthetic mica, glass piece, alumina or transparent film piece, with a metal oxide such as titanium oxide.

Specific examples of products comprising the thermochromic color-memorizing composition, the thermochromic color-memorizing microcapsule pigment encapsulating the same and the ink are listed below.

(1) Toys:
dolls and animal-figured toys; hair of dolls and animal-figured toys; dollhouses and furnitures thereof; doll accessories such as clothes, hats, bags and shoes; accessory toys; stuffed dolls and animals; painting toys; illustrated books for toys; puzzle toys such as jigsaw puzzles; toy bricks; block toys; clay toys; fluid toys; spinning tops; kites; musical toys; cooking toys; gun toys; capturing toys; background toys; toys imitating vehicles, animals, plants, buildings and food articles; and the like;

(2) Clothings:
outerwears such as T-shirts, sweaters, blouses, dresses, swimsuits, raincoats and ski wears; footwears such as shoes and shoelaces; personal effects made of cloth, such as handkerchiefs, towels and wrapping cloths; gloves; neckties; hats; and the like;

(3) Interior Ornaments:
rugs, curtains, curtain cords, tablecloths, carpets, cushions, picture frames, imitation flowers, photo stands and the like;

(4) Furnitures:
beddings such as bedclothes, pillows and mattresses; lighting fixtures; air conditioners; and the like;

(5) Accessories:
rings, bracelets, tiaras, earrings, hair stoppers, artificial nails, ribbons, scarfs, watches, glasses and the like;

(6) Stationeries:
writing implements, stamps, erasers, celluloid boards, rulers, adhesive tapes and the like;

(7) Daily Necessaries:
cosmetics such as lipsticks, eye-shadows, manicures, hair dyes, artificial nails and paints for artificial nails; toothbrushes; and the like;

(8) Kitchen Utensils:
cups, dishes, chopsticks, spoons, forks, pots, frying pans and the like; and (9) Other Products:
various printed articles, such as calendars, labels, cards, recording materials and those for forgery prevention; books such as illustrated books; bags; packaging containers; embroidery threads; sporting gears; fishing gears; coasters; musical instruments; pocket warmers; refrigerators; pouch articles such as wallets; umbrellas; vehicles; buildings; indicators for temperature detection; training and learning articles; and the like.

EXAMPLES

Examples of the present invention will be described below; however, the present invention is not restricted thereto.

The methods of producing the thermochromic color-memorizing composition of the respective Examples and the methods of producing microcapsule pigments encapsulating the respective compositions as well as the method of measuring the hysteresis characteristics of the thermochromic color-memorizing compositions and microcapsule pigments based on temperature change will now be described.

It is noted here that the unit "part(s)" used in the following Examples represents "part(s) by mass".

Example 1

Method of Preparing Thermochromic Color-memorizing Composition

Three components composed of 1 part of 3-(2-ethoxy-4-diethylaminophenyl)-3-(1-ethyl-2-methylindol-3-yl)-4-azaphthalide as the component (a), 2 parts of 2,2-bis(4-hydroxyphenyl)hexafluoropropane as the component (b) and 50 parts of benzoic acid ester of decyl p-hydroxybenzoate (Compound 5) as the component (c) were mixed, and the resultant was heated and uniformly dissolved to obtain a thermochromic color-memorizing composition.

The thus obtained thermochromic color-memorizing composition showed discoloration from blue to colorless.

Preparation of Measurement Sample

The thermochromic color-memorizing composition was filled into a transparent glass capillary tube having an inner diameter of 1 mm and a length of 78 mm up to a height of about 10 mm from the bottom of the capillary tube, thereby preparing a measurement sample.

Measurement of Discoloration Temperature

The entirety of the thus obtained measurement sample containing the thermochromic color-memorizing composition was immersed in a transparent heating medium. While changing the temperature of the transparent heating medium, the discoloration state of the thermochromic color-memorizing composition was visually observed, and $T_1$ (complete coloration temperature), $T_2$ (coloration on-set temperature), $T_3$ (decoloration on-set temperature) and $T_4$ (complete decoloration temperature) were measured to determine $T_H$ [the middle temperature between $T_1$ and $T_2$: $(T_1+T_2)/2$], $T_G$ [the middle temperature between $T_3$ and $T_4$: $(T_3+T_4)/2$] and $\Delta H$ (hysteresis width: $T_G-T_H$).

The thermochromic color-memorizing composition of Example 1 showed the following hysteresis characteristics: $T_1=21°$ C., $T_2=23°$ C., $T_3=62°$ C., $T_4=68°$ C., $T_H=22°$ C., $T_G=65°$ C. and $\Delta H=43°$ C.

Examples 2 to 6

The thermochromic color-memorizing compositions of Examples 2 to 6 were prepared in the same manner as in Example 1 except that the components (a) and (c) of each thermochromic color-memorizing composition were changed as shown in the table below, and their discoloration temperatures were also measured in the same manner as in Example 1.

TABLE 1

| Example | Component (a) | Amount | Component (b) | Amount | Component (c) | Amount |
|---|---|---|---|---|---|---|
| 1 | P | 1 | 2,2-bis(4-hydroxyphenyl) hexafluoropropane | 2 | benzoic acid ester of decyl p-hydroxybenzoate (Compound 5) | 50 |
| 2 | Q | 1 | 2,2-bis(4-hydroxyphenyl) hexafluoropropane | 2 | benzoic acid ester of decyl p-hydroxybenzoate (Compound 5) | 50 |
| 3 | R | 1 | 2,2-bis(4-hydroxyphenyl) hexafluoropropane | 2 | benzoic acid ester of decyl p-hydroxybenzoate (Compound 5) | 50 |
| 4 | P | 1 | 2,2-bis(4-hydroxyphenyl) hexafluoropropane | 2 | o-methoxy benzoic acid ester of dodecyl p-hydroxybenzoate (Compound 16) | 50 |
| 5 | P | 1 | 2,2-bis(4-hydroxyphenyl) hexafluoropropane | 2 | p-methoxy benzoic acid ester of heptyl p-hydroxybenzoate (Compound 18) | 50 |
| 6 | P | 1 | 2,2-bis(4-hydroxyphenyl) hexafluoropropane | 2 | benzoic acid ester of cyclohexylmethyl p-hydroxybenzoate (Compound 62) | 50 |

As for the component (a) shown in Table 1, "P" is 3-(2-ethoxy-4-diethylaminophenyl)-3-(1-ethyl-2-methylindol-3-yl)-4-azaphthalide; "Q" is 1,2-benz-6-(N-ethyl-N-isoamylamino)fluoran; "R" is 2-(2-chloroanilino)-6-di-n-butylaminofluoran. Further, the unit of the amount is parts by mass.

The discolorations and the values of $T_1$, $T_2$, $T_3$, $T_4$, $T_H$, $T_G$ and $\Delta H$ of the thermochromic color-memorizing compositions of Examples 1 to 6 are shown in the table below.

[Table 2]

TABLE 2

| Example | Color change coloration ⇔ decoloration | $T_1$ | $T_2$ | $T_3$ | $T_4$ | $T_H$ | $T_G$ | $\Delta H$ |
|---|---|---|---|---|---|---|---|---|
| 1 | blue ⇔ colorless | 21 | 23 | 62 | 68 | 22 | 65 | 43 |
| 2 | pink ⇔ colorless | 18 | 20 | 59 | 67 | 19 | 63 | 44 |
| 3 | black ⇔ colorless | 28 | 30 | 55 | 65 | 29 | 60 | 31 |
| 4 | blue ⇔ colorless | 5 | 7 | 47 | 53 | 6 | 50 | 44 |
| 5 | blue ⇔ colorless | 8 | 10 | 55 | 65 | 9 | 60 | 51 |
| 6 | blue ⇔ colorless | 29 | 35 | 63 | 73 | 32 | 68 | 36 |

Discoloration characteristics (° C.)

Example 7

Method of Preparing Thermochromic Color-memorizing Microcapsule Pigment

Thermochromic color-memorizing composition composed of 1 part of 3-(2-ethoxy-4-diethylaminophenyl)-3-(1-ethyl-2-methylindol-3-yl)-4-azaphthalide as the component (a), 5 parts of 2,2-bis(4-hydroxyphenyl)hexafluoropropane as the component (b), 50 parts of benzoic acid ester of octyl p-hydroxybenzoate (Compound 3) and 3 parts of decyl myristate as the component (c) was mixed and uniformly melted by heating. The resultant was further mixed with 20 parts of an aromatic polyvalent isocyanate prepolymer as a membrane wall material and 40 parts of ethyl acetate, and the resulting solution was added to 100 parts of a 15% aqueous gelatin solution and emulsion-dispersed to form microdroplets.

After continuously stirring the thus obtained dispersion at 70° C. for about 1 hour, an aqueous solution obtained by dissolving 2 parts of a water-soluble amine compound (manufactured by Mitsubishi Chemical Corporation, trade name: jER CURE U; an amine adduct of epoxy resin) in 23 parts of water was slowly added thereto with stirring, and the resultant was further continuously stirred for about 3 hours with the temperature thereof being maintained at 90° C., thereby obtaining thermochromic color-memorizing microcapsule pigment suspension.

From this microcapsule pigment suspension, thermochromic color-memorizing microcapsule pigment was isolated by centrifugation to obtain thermochromic color-memorizing microcapsule pigment showing discoloration from blue to colorless (average particle size: 1.7 μm).

Preparation of Measurement Sample

Thermochromic color-memorizing ink was prepared by uniformly dispersing 40 parts of the thus obtained thermochromic color-memorizing microcapsule pigment in an aqueous ink vehicle composed of 50 parts of an ethylene-vinyl acetate resin emulsion, 1 part of a leveling agent, 1 part of an antifoaming agent, 0.5 parts of a viscosity-adjusting agent and 7.5 parts of water. A solid pattern was screen-printed using the thus obtained ink on a high-quality paper to prepare a measurement sample.

Measurement of Hysteresis Characteristics

The thus obtained measurement sample was set in the measuring section of a differential colorimeter (TC-3600 differential colorimeter, manufactured by Tokyo Denshoku Co., Ltd.). The sample portion was heated and cooled at a rate of 2° C./min to measure the brightness as the color density at each temperature and a color density-temperature curve was prepared. From this color density-temperature curve, $T_1$, $T_2$, $T_3$, $T_4$, $T_H$ [the middle temperature between $T_1$ and $T_2$: $(T_1+T_2)/2$], $T_G$ [the middle temperature between $T_3$ and $T_4$: $(T_3+T_4)/2$] and $\Delta H$ (hysteresis width: $T_G-T_H$) were determined.

The thermochromic color-memorizing microcapsule pigment showed the following hysteresis characteristics: $T_1$=−15° C., $T_2$=−11° C., $T_3$=40° C., $T_4$=64° C., $T_H$=−13° C., $T_G$=52° C. and $\Delta H$=65° C.

Examples 8 and 9

The thermochromic color-memorizing microcapsule pigments of Examples 8 and 9 were prepared in the same manner as in Example 7 except that the components (a) and (c) of each thermochromic color-memorizing composition encapsulated in a microcapsule and their amounts were changed to the respective compounds and amounts as shown in Table 3 below, and the hysteresis characteristics were also measured in the same manner as in Example 7.

TABLE 3

| Example | Component (a) | Amount | Component (b) | Amount | Component (c) | Amount | Average particle size (μm) |
|---|---|---|---|---|---|---|---|
| 7 | P | 1 | 2,2-bis(4-hydroxyphenyl) hexafluoropropane | 5 | benzoic acid ester of octyl p-hydroxybenzoate (Compound 3) | 50 | 1.7 |
| | | | | | decyl myristrate | 3 | |
| 8 | P | 1 | 2,2-bis(4-hydroxyphenyl) hexafluoropropane | 5 | p-methoxy benzoic acid ester of heptyl p-hydroxybenzoate (Compound 18) | 50 | 2.1 |
| | | | | | p-methylbenzyl stearate | 3 | |
| 9 | Q | 2 | 2,2-bis(4-hydroxyphenyl) hexafluoropropane | 5 | p-methoxy benzoic acid ester of heptyl p-hydroxybenzoate (Compound 18) | 50 | 1.9 |
| | | | | | p-methylbenzyl stearate | 3 | |

As for the component (a) shown in Table 3, "A" is 3-(2-ethoxy-4-diethylaminophenyl)-3-(1-ethyl-2-methylindol-3-yl)-4-azaphthalide and "B" is 1,2-benz-6-(N-ethyl-N-isoamylamino)fluoran. Further, in Table 3, the unit of the amount is parts by mass.

The discolorations and the values of $T_1$, $T_2$, $T_3$, $T_4$, $T_H$, $T_G$ and $\Delta H$ of the thermochromic color-memorizing microcapsule pigments of Examples 7 to 9 are shown in the table below.

[Table 4]

TABLE 4

| Example | Color change coloration⇔decoloration | Discoloration characteristics (° C.) | | | | | | |
|---|---|---|---|---|---|---|---|---|
| | | $T_1$ | $T_2$ | $T_3$ | $T_4$ | $T_H$ | $T_G$ | $\Delta H$ |
| 7 | blue⇔colorless | −15 | −11 | 40 | 64 | −13 | 52 | 65 |
| 8 | pink⇔colorless | −14 | −4 | 41 | 65 | −9 | 53 | 62 |
| 9 | black⇔colorless | −18 | −4 | 38 | 64 | −11 | 51 | 62 |

Application Example 1

A liquid thermochromic color-memorizing composition (ink composition for writing instruments) was prepared by uniformly dispersing 27 parts of the thermochromic color-memorizing microcapsule pigment prepared in Example 7 (which had been cooled to −15° C. or lower to develop a blue color in advance) in a vehicle composed of 0.3 parts of succinoglycan (shear-thinning agent), 3.0 parts of a sugar mixture [manufactured by Sanwa Starch Co., Ltd., trade name: SANDEC 70], 0.5 parts of a phosphate-based surfactant, 0.1 parts of an antifungal agent, 1.0 part of triethanolamine and 68.1 parts of water.

Preparation of Writing Instrument

An ink-storing tube composed of a polypropylene pipe was filled by suction with the thus obtained ink and connected via a resin-made holder with a ballpoint pen tip holding a 0.5-mm stainless-steel ball on its end.

Then, a viscoelastic ink follower (liquid plug) containing polybutene as a main component was filled from the rear end of the polypropylene pipe to obtain a ballpoint pen refill.

This ballpoint pen refill was incorporated into an axial barrel to obtain a writing instrument (retractable ballpoint pen).

This writing instrument had a structure in which the ballpoint pen refill was stored inside the axial barrel with a tip provided thereon being exposed to the outside air and the tip was projected from the front-end opening of the axial barrel by the action of a clip-shaped projection-retraction mechanism (sliding mechanism) arranged on the side of the axial barrel.

On the rear end of the axial barrel, a friction member made of an SEBS resin was arranged.

With the end of the ballpoint pen tip being projected from the front-end opening of the axial barrel by the action of the projection-retraction mechanism, a blue letter (handwriting) was formed by writing on a sheet of paper.

When this handwriting was rubbed with the SEBS resin-made friction member arranged on the rear end of the axial barrel, the letter was decolored to colorless, and this state could be maintained under room temperature.

Meanwhile, when the sheet of paper after the decoloration was put into a freezer and cooled to a temperature of −15° C. or lower, the letter showed a discoloration behavior of turning blue again, and this behavior was repeatedly reproducible.

Application Example 2

A liquid thermochromic color-memorizing composition (ink for writing instruments) was prepared by uniformly dispersing 27 parts of the thermochromic color-memorizing microcapsule pigment prepared in Example 8 (which had been cooled to −14° C. or lower to develop a blue color in advance) in an aqueous ink vehicle composed of 0.33 parts of xanthan gum (shear-thinning agent), 10.0 parts of urea, 10 parts of glycerin, 0.6 parts of a nonionic surfactant, 0.1 parts of a modified silicone-based antifoaming agent, 0.2 parts of an antifungal agent and 51.77 parts of water.

Preparation of Writing Instrument

A polypropylene pipe was filled by suction with the thus obtained ink and connected via a resin-made holder with a ballpoint pen tip holding a 0.5-mm stainless-steel ball on its end.

Then, a viscoelastic ink follower (liquid plug) containing polybutene as a main component was filled from the rear end of the polypropylene pipe and a tail plug was fitted to the rear of the pipe. After assembling a front axial barrel and a rear axial barrel thereto and further fitting a cap, the resultant was subjected to a degassing treatment by centrifugation to prepare a writing instrument (ballpoint pen).

To the back of the rear axial barrel, an SEBS rubber was attached as a friction body.

Using the thus obtained writing instrument, a blue letter (handwriting) was formed by writing on a sheet of paper. This handwriting showed a blue color at room temperature (25° C.) and, when the letter was rubbed with the friction body, the letter was decolored to colorless and this state could be maintained under room temperature.

Meanwhile, when the sheet of paper after the decoloration was put into a freezer and cooled to a temperature of −14° C. or lower, the letter showed a discoloration behavior of turning blue again, and this behavior was repeatedly reproducible.

Application Example 3

A liquid thermochromic color-memorizing composition (ink for writing instruments) was prepared by mixing 25 parts of the thermochromic color-memorizing microcapsule pigment prepared in Example 9 (which had been cooled to −18° C. or lower to develop a pink color in advance) with 0.5 parts of hydroxyethyl cellulose, 0.2 parts of a comb-type polymeric dispersant [manufactured by Lubrizol Japan Ltd., trade name: SOLSPERSE 43000], 1.0 part of an organic nitrogen sulfur compound [manufactured by Hokko Chemical Industry Co., Ltd., trade name: HOKUSIDE R-150, a mixture of 2-methyl-4-isothiazolin-3-one and 5-chloro-2-methyl-4-isothiazolin-3-one], 0.5 parts of polyvinyl alcohol, 25.0 parts of glycerin, 0.02 parts of an antifoaming agent and 47.78 parts of water.
Preparation of Filled-in Type Writing Instrument An ink absorbent prepared by covering a polyester sliver with a synthetic resin film was impregnated with the thus obtained ink and inserted into an axial barrel made of a polypropylene resin. Then, the axial barrel was assembled with a resin-processed pen body (cannonball shape) made of polyester fibers via a holder in such a manner that the front end of the axial barrel was in contact with the pen body, and a cap was further fitted thereto to obtain a writing instrument (marking pen).

On the rear end of the axial barrel, a friction member made of an SEBS resin was fitted.

Using the thus obtained writing instrument, a pink letter (handwriting) was formed by writing on a sheet of paper. This handwriting showed a pink color at room temperature (25° C.) and, when the letter was rubbed with the friction member, the letter was decolored to colorless and this state could be maintained under room temperature.

Meanwhile, when the sheet of paper after the decoloration was put into a freezer and cooled to a temperature of −18° C. or lower, the letter showed a discoloration behavior of turning pink again, and this behavior was repeatedly reproducible.

Application Example 4

A liquid thermochromic color-memorizing composition (paint) was prepared by uniformly dispersing 2.5 parts of the thermochromic color-memorizing microcapsule pigment prepared in Example 8 and 1.5 parts of a non-thermochromic fluorescent pink pigment in an oil-based ink vehicle composed of 12.5 parts of a vinyl chloride-vinyl acetate copolymer resin, 38.3 parts of xylene, 45 parts of butyl acetate and 0.2 parts of a viscosity-adjusting agent.

After allowing the thus obtained paint to change its color to purple by cooling it to a temperature of −14° C. or lower, the paint was spray-coated on a plug part (white) of a household electric cord to form a reversibly thermochromic layer, thereby obtaining thermochromic color-memorizing plug.

This plug showed a purple color at room temperature (25° C.); however, when heated, it turned pink at a temperature of 65° C. or higher. When the plug was cooled from this discolored state, it again showed a purple color at a temperature of −14° C. or lower.

Once this thermochromic color-memorizing plug turns pink at a temperature of 65° C. or higher, it is capable of maintaining a discolored state in pink unless it is cooled to a temperature of −14° C. or lower. This enabled to visually detect the temperature history when the plug was abnormally overheated and reached a high-temperature range of 65° C. or higher.

Application Example 5

A liquid thermochromic color-memorizing composition (printing ink) was prepared by uniformly dispersing 30 parts of the thermochromic color-memorizing microcapsule pigment prepared in Example 7 (which had been cooled to −15° C. or lower to develop a blue color in advance) in an aqueous ink vehicle composed of 60 parts of an acrylic resin emulsion (solid content: 45%), 1 part of a viscosity-adjusting agent, 0.2 parts of an antifoaming agent and 8.8 parts of water.

Using the thus obtained ink, a large number of star patterns were screen-printed on a white T-shirt (made of cotton) with a 100-mesh screen plate to obtain thermochromic color-memorizing T-shirt.

On this T-shirt, a large number of blue star patterns were visually recognized at room temperature (25° C.) and the star patterns were not changed by the body temperature or ambient temperature; however, when the T-shirt was heated to 64° C. or higher, the star patterns turned colorless, and they were again visually recognized in blue when the T-shirt was cooled to −15° C. or lower.

It was possible to arbitrarily change the design of the T-shirt by decoloring some of the star patterns with heating using an iron or the like to form white void patterns in which only arbitrary stars were decolored or to form letters or patterns with the star patterns. Further, the T-shirt was able to retain such a discolored state in a room temperature range, and an arbitrary design could be again formed as described above by heating the whole T-shirt to 64° C. or higher to decolor all of the star patterns and then cooling the T-shirt to −15° C. or lower to allow all of the stars to show the color.

Application Example 6

Using an extruder, 5 parts of the thermochromic color-memorizing microcapsule pigment prepared in Example 8, 1 part of a dispersant, 0.1 parts of a non-thermochromic pink pigment and 93.9 parts of a polypropylene homopolymer were melt-mixed at 180° C. to obtain a resin composition for thermochromic color-memorizing molded article (pellet).

From the thus obtained pellet, a plastic cup was molded using an injection molding machine at a cylinder temperature of 180° C.

This cup turned purple when cooled to −14° C. or lower and the cup remained in purple even after being left to stand at room temperature (25° C.); however, when a drink of 65° C. or higher is poured therein, the portion of the cup in contact with the drink turned pink. When the drink was removed and the cup was cooled to −14° C. or lower, the portion discolored in pink turned back to purple.

Application Example 7

A liquid thermochromic color-memorizing composition (printing ink) was prepared by uniformly dispersing 20 parts of the thermochromic color-memorizing microcapsule pigment prepared in Example 9 (which had been cooled to −18° C. or lower to develop a pink color in advance) in an aqueous ink vehicle composed of 78.0 parts of an acrylic resin emulsion (solid content: 40%) and 2.0 parts of an antifoaming agent.

Using the thus obtained thermochromic color-memorizing ink, a forgery detection mark was gravure-printed on a gift certificate printed with a non-thermochromic ink on a high-quality paper. This forgery detection mark showed a pink color at room temperature (25° C.) and its color was not changed by the body temperature or ambient temperature; however, the mark turned colorless when heated to 64° C. or higher, and the mark again showed a pink color when cooled to −18° C. or lower.

Since this forgery detection mark of the gift certificate shows a pink color and does not change its color in a room temperature range, it cannot be discriminated as a forgery detection mark; however, the mark turns colorless when heated to 64° C. or higher and thus has a forgery-preventing function.

DESCRIPTION OF SYMBOLS $T_1$: complete coloration temperature
$T_2$: coloration on-set temperature
$T_3$: decoloration on-set temperature
$T_4$: complete decoloration temperature
$\Delta H$: hysteresis width

The invention claimed is:
1. Thermochromic color-memorizing composition comprising:
   (a) an electron-donating color-developing organic compound;
   (b) an electron-accepting compound; and
   (c) an ester compound represented by the following formula (1) as a reaction medium which controls color reaction between said components (a) and (b):

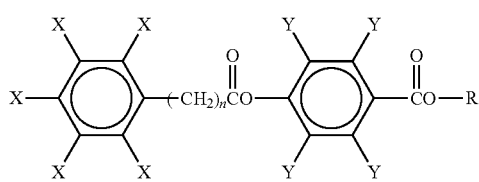

(1)

(wherein, R represents an alkyl group having 4 to 22 carbon atoms, an alkenyl group having 4 to 22 carbon atoms, a cycloalkylalkyl group having 6 to 11 carbon atoms or a cycloalkyl group having 5 to 7 carbon atoms; Xs each independently represent a hydrogen atom, an alkyl group, an alkoxy group or a halogen atom; Ys each independently represent a hydrogen atom, an alkyl group, an alkoxy group or a halogen atom; and n represents 0 or 1).

2. The composition according to claim 1, wherein, in said ester compound represented by said formula (1), said R represents an alkyl group having 6 to 16 carbon atoms or a cycloalkylalkyl group having 6 to 10 carbon atoms; said Xs represent a hydrogen atom, an alkyl group having 1 to 8 carbon atoms or an alkoxy group having 1 to 8 carbon atoms; and said Ys represent a hydrogen atom, an alkyl group having 1 to 8 carbon atoms or an alkoxy group having 1 to 8 carbon atoms.

3. The composition according to claim 1, wherein said component (a) is a compound selected from the group consisting of phthalide compounds, fluoran compounds, styrynoquinoline compounds, diazarhodamine lactone compounds, pyridine compounds, quinazoline compounds and bisquinazoline compounds.

4. The composition according to claim 1, wherein the ratio of said component (b) and that of said component (c) are, based on mass, 0.1 to 50 parts and 1 to 800 parts, respectively, with respect to 1 part of said component (a).

5. The composition according to claim 1, which has a hysteresis width ($\Delta H$) of 8° C. to 80° C.

6. Thermochromic color-memorizing microcapsule pigment encapsulating the thermochromic color-memorizing composition according to claim 1.

7. Ink composition comprising:
   the microcapsule pigment according to claim 6; and
   a vehicle.

8. The ink composition according to claim 7, comprising said thermochromic color-memorizing microcapsule pigment in an amount of 5 to 40% by mass with respect to the total mass of said ink composition.

9. Writing instrument comprising:
   an axial barrel which stores the ink composition according to claim 7; and
   a pen body which delivers said ink composition stored in said axial barrel.

10. The writing instrument according to claim 9, further comprising a friction member.

* * * * *